US009489289B2

(12) United States Patent
Hu et al.

(10) Patent No.: US 9,489,289 B2
(45) Date of Patent: Nov. 8, 2016

(54) ADAPTIVE FRAMEWORK AUTOMATICALLY PRIORITIZING SOFTWARE TEST CASES

(71) Applicants: Ziheng Hu, Shanghai (CN); Jing Li, Shanghai (CN); Xin Li, Shanghai (CN); Chen Zhou, Shanghai (CN); Longhui Chang, Shanghai (CN)

(72) Inventors: Ziheng Hu, Shanghai (CN); Jing Li, Shanghai (CN); Xin Li, Shanghai (CN); Chen Zhou, Shanghai (CN); Longhui Chang, Shanghai (CN)

(73) Assignee: SAP SE, Walldorf (DE)

( * ) Notice: Subject to any disclaimer, the term of this patent is extended or adjusted under 35 U.S.C. 154(b) by 182 days.

(21) Appl. No.: 14/565,220

(22) Filed: Dec. 9, 2014

(65) Prior Publication Data

US 2016/0162392 A1 Jun. 9, 2016

(51) Int. Cl.
*G06F 11/00* (2006.01)
*G06F 11/36* (2006.01)

(52) U.S. Cl.
CPC ....... *G06F 11/3684* (2013.01); *G06F 11/3688* (2013.01)

(58) Field of Classification Search
CPC .......... G06F 11/3684; G06F 11/3688; G06F 11/3676
See application file for complete search history.

(56) References Cited

U.S. PATENT DOCUMENTS

| | | | | |
|---|---|---|---|---|
| 8,230,401 B2* | 7/2012 | Branca | ................ | G06F 11/3688 717/135 |
| 8,972,938 B2* | 3/2015 | Bnayahu | ................... | G06F 8/10 455/404.2 |
| 8,997,061 B1* | 3/2015 | Davison | ............. | G06F 11/3688 717/124 |
| 2005/0261859 A1* | 11/2005 | Petsinger | ............. | G06F 11/261 702/120 |
| 2006/0129994 A1* | 6/2006 | Srivastava | .......... | G06F 11/3676 717/124 |
| 2007/0061626 A1* | 3/2007 | Nelson | ................ | G06F 11/3688 714/38.14 |
| 2007/0094189 A1* | 4/2007 | Yamamoto | .......... | G06F 11/3684 706/45 |
| 2008/0120601 A1* | 5/2008 | Ashida | ................ | G06F 11/3688 717/124 |
| 2009/0265681 A1* | 10/2009 | Beto | ................... | G06F 11/3688 717/100 |
| 2009/0265693 A1* | 10/2009 | Bakowski | ........... | G06F 11/3688 717/131 |
| 2013/0014090 A1* | 1/2013 | Takahashi | ........... | G06F 11/3676 717/132 |
| 2014/0380279 A1* | 12/2014 | Bartley | ............... | G06F 11/3676 717/124 |
| 2015/0007140 A1* | 1/2015 | Boshernitsan | ...... | G06F 11/3688 717/124 |
| 2015/0026121 A1* | 1/2015 | Shani | .................. | G06F 11/3688 707/609 |
| 2015/0293837 A1* | 10/2015 | Rajamanickam | ... | G06F 11/3676 717/130 |
| 2016/0034375 A1* | 2/2016 | Sinha | .................. | G06F 11/3688 717/131 |
| 2016/0117239 A1* | 4/2016 | Hamilton, II | ....... | G06F 17/3053 717/124 |

\* cited by examiner

*Primary Examiner* — Marc Duncan
(74) *Attorney, Agent, or Firm* — Fountainhead Law Group PC

(57) ABSTRACT

An automated, self-adaptive framework prioritizes software testing in a consistent and effective manner. A metric evaluates past test execution information for assigning regression testing priority. The metric may be calculated with reference to one or more of the following factors taken in combination: requirement, coverage, history, and cost. The requirement factor considers customer-assigned priority of testing the code, complexity of implementing the code, and proneness of the code to faults. The coverage factor considers code coverage, feature coverage, and common usage rate. The history factor considers previous bug found rate, case stable rate, and priority to calculate. The cost factor considers test case execution time, and step length. A value of each factor for one test case is measured according to that test case and is not related to other test cases. The calculation result representing the metric for each test case determines a priority of the test case.

20 Claims, 11 Drawing Sheets

ADAPTIVE FRAMEWORK AUTOMATICALLY PRIORITIZING SOFTWARE TEST CASES

BACKGROUND

Unless otherwise indicated herein, the approaches described in this section are not prior art to the claims in this application and are not admitted to be prior art by inclusion in this section.

Embodiments relate to software testing, and in particular, to prioritizing software testing in an adaptive manner.

Software programs typically undergo a battery of testing during their lifetimes. For example, software may evolve as problems are discovered and then fixed by patches, and also as new features are added. Integration testing refers to the testing of integrated parts of the software, for example the interaction between new/changed features and existing features.

Regression testing is the re-execution of some subset of test that has already been conducted. As integration testing proceeds, the total possible number of regression tests increases. However, it soon becomes impractical and inefficient to re-execute every test for every program function once a change is made to any part of the software.

Thus in order to improve testing efficiency, an order for performing regression testing may be prioritized. Test case prioritization techniques involve scheduling a repeat of test cases according to an order improving the performance and/or coverage of regression testing. In this context, prioritization techniques can take advantage of information gathered about the previous execution of test cases in order to obtain an efficient ordering of test cases.

The actual priority of every test may not be consistent, however. This is because new features are introduced to the software in an ongoing manner. Conventional approaches that manually adjusting a priority of each test, are labor intensive and consume effort and expense. Manual test prioritization may also introduce misjudgment based upon the inconsistent exercise of human discretion.

SUMMARY

Embodiments relate to methods and apparatuses providing an automated, self-Adaptive Test Case Prioritizer (ATCP) framework for prioritizing software testing in a consistent and effective manner. Particular embodiments may create a metric for evaluating past test execution information, in order to prioritize current test cases for regression testing. Such an adaptive test case prioritizing framework allows prioritizing a set of test cases according to a calculation that is based on one or more of the following factors: requirement, coverage, history and cost. The requirement factor considers information such as a customer-assigned priority of testing the code, a complexity of implementing the code, and proneness of the code to faults. The coverage factor considers information such as code coverage, feature coverage, and common usage rate. The history factor considers information such as previous bug found rate, a case stable rate, and a priority to calculate. Finally, the cost factor considers information such as test case execution time, and step length.

Where regression testing takes place over a number of rounds, the prioritization metric is re-calculated for each round, with one or more of the factors input to form a basis for this calculation, changed based upon the results of the previous round. In this manner, the assignment of priority by the ATCP framework can adapt to the results of previous testing.

An embodiment of a computer-implemented method comprises, an engine receiving a user input and information about a software test case from a database. The engine processes the information to calculate in a first testing round, a first metric for the software test case. The engine assigns a testing priority to the software test case for the first testing round based upon the first metric. The engine communicates the testing priority to the database for storage.

In certain embodiments, the engine receives another user input and updated information about the software test case from the database, and the engine processes the updated information to calculate in a second testing round, a second metric for the software test case. The engine assigns an adaptive testing priority to the software test case for the second testing round based on the second metric, and the engine communicates the adaptive testing priority to the database for storage.

In some embodiments the engine receives the testing priority from the database, and the engine calculates the second metric based upon the testing priority and the updated information.

In various embodiments the updated information comprises at least one of updated history information, updated coverage information, and updated cost information.

In particular embodiments the information comprises requirement information including at least one of a customer-assigned priority value, an implementation complexity value, and a fault proneness value.

According to certain embodiments the information comprises coverage information including at least one of a code coverage rate, and a feature coverage rate.

In various embodiments the information comprises history information including at least one of a case stable rate and a bug found rate.

According to particular embodiments the information comprises cost information including at least one of a step length rate and a test case execution time rate.

Some embodiments further comprise the engine communicating the first metric to the database for storage.

An example of a non-transitory computer readable storage medium embodies a computer program for performing a method. The method comprises an engine receiving a user input and information about a software test case from a database, the information comprising at least one of requirement information, coverage information, history information, and cost information. The engine processes the information to calculate in a first testing round, a first metric for the software test case. The engine assigns a testing priority to the software test case for the first testing round based upon the first metric. The engine communicates the testing priority to the database for storage.

An embodiment of a computer system comprises one or more processors and a software program executable on said computer system. The software program is configured to cause an engine to receive a user input and information about a software test case from a database. The software program is configured to cause the engine to process the information to calculate in a first testing round, a first metric for the software test case. The software program is configured to cause the engine to assign a testing priority to the software test case for the first testing round based upon the first metric. The software program is configured to cause the engine to communicate the testing priority to the database for storage. The software program is configured to cause the engine to receive another user input and updated information about the software test case from the database. The software program is configured to cause the engine to process the updated information to calculate in a second testing round, a second metric for the software test case. The software program is configured to cause the engine to assign an adaptive testing priority to the software test case for the second testing round based on the second metric. The software program is configured to cause the engine to communicate the adaptive testing priority to the database for storage.

The following detailed description and accompanying drawings provide a better understanding of the nature and advantages of the present invention.

DETAILED DESCRIPTION

Described herein are techniques for prioritizing software testing according to an embodiment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments relate to an automated, self-adaptive framework that prioritizes software testing in a consistent and effective manner. The framework includes a prioritization engine that is in communication with software testing data stored in a database. The engine accesses the stored testing data and performs a calculation thereon. This calculation generates a metric evaluating past test execution information for assigning regression testing priority.

The metric may be calculated with reference to one or more of the following factors taken in combination: requirement, coverage, history and cost. The requirement factor considers information such as a customer-assigned priority of testing the code, complexity of implementing the code, and proneness of the code to faults. The coverage factor considers code coverage, feature coverage, and common usage rate. The history factor considers previous bug found rate, case stable rate, and priority to calculate. The cost factor considers test case execution time, and step length.

Figure 1:
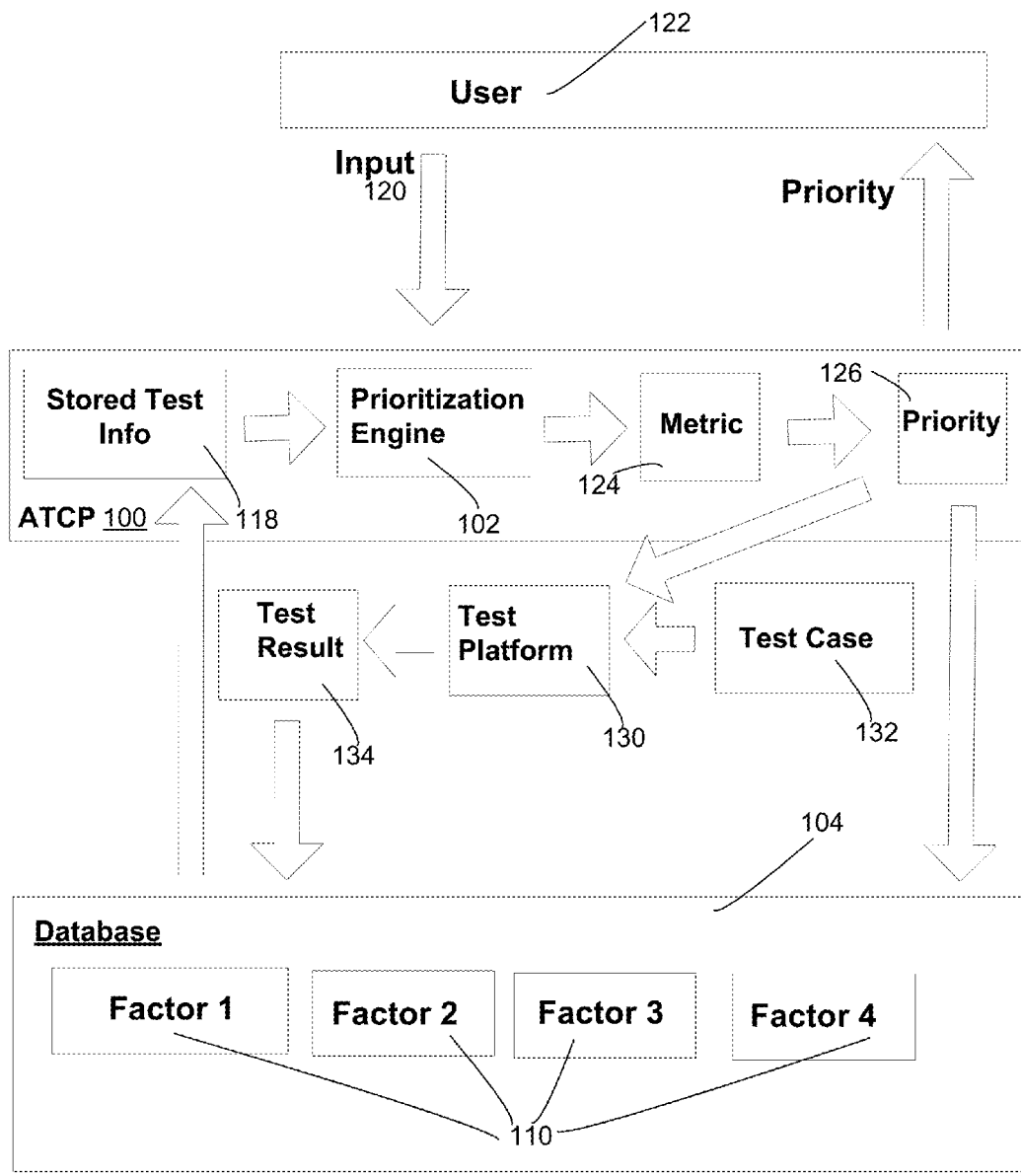
FIG. 1 is a simplified view of an embodiment of a system configured to perform test case prioritization.

FIG. 1 shows a simplified view of an embodiment of an Adaptive Test Case Prioritizer (ATCP) framework 100. The ATCP framework comprises prioritization engine 102 that is in communication with a database 104 of a database layer. In some embodiments, the ATCP framework may be present on a client, and the database layer may be hosted on a server remote from the client. Particular embodiments may be designed to interface with information stored by the TESTLINK open source web based test management system.

The database may comprise a variety of different factors 110 that are relevant various aspects of software testing. For example, the database may store information types not limited to one or more of the following:

- a test priority assigned by a customer (having detailed knowledge of the structure and operation of the software);
- a relative complexity of the software being tested;
- a relative tendency of faults to be exposed during the testing;
- a test coverage base of source code (e.g., reflecting criteria such as function, statement, line, condition coverage);
- a feature coverage of source code (e.g., reflecting specific features that are included in the code);
- a common usage rate (e.g., whether features in the code are commonly or rarely accessed);
- a historical bug found rate in the code based upon previous regression testing;
- a historical stability of any previous regression testing on the code (e.g., whether prior regression testing was able to be performed successfully);
- a historical priority of the regression test;
- a cost of the regression testing expressed in execution time;
- a cost of the regression testing expressed in step length.

One or more of these factors relevant to test prioritization may be stored as a dataset 118 in the ATCP system. Based upon an input 120 received from a user 122 and the value of one or more of these factors 110 and/or others relating to a priority of regression testing, the engine may calculate a metric 124. In some embodiments this metric takes the form of a numerical value.

From this calculated metric, the ATCP assigns a corresponding priority 126 to a particular regression test case. In certain embodiments this priority may comprise three tiers: high priority, medium priority, or low priority.

It is noted that the instant description focuses upon particular embodiments calculating a prioritization metric from four different types of information: requirement, coverage, history, and cost. However, embodiments are not limited to considering these or any other specific information types in calculating a prioritization metric. Various embodiments could calculate a prioritization metric from only one information type, or from a combination of less than four information types, or from five or more information types.

The priority (and also possibly the metric and/or its various components) may be communicated back to the user. The priority (and also possibly the metric and/or its various components) may be communicated to the database layer for storage and reference in calculating test case prioritization for future testing rounds.

The priority is input to a testing platform 130 for execution of the regression test case 132 in an order dictated by the priority. Results 134 of the regression test may be communicated to the database layer for storage and reference in calculating prioritization in future testing rounds.

It is noted that the regression testing takes place in an iterative manner over a number of rounds. Embodiments of the ATCP framework take advantage of this iterative nature of software testing, in order to implement adaptive functionality in assigning priority.

Specifically, the ATCP framework calculates priority of regression testing for each round. That is, the prioritization metric is re-calculated for each round, with one or more of the factors input to form a basis for this calculation, changed based upon the results of the previous round.

In this manner, the assignment of priority by the ATCP framework can adapt to the results of previous testing. That is, the results of regression testing in one round, to be considered in assigning a priority to regression testing in subsequent round(s).

This adaptive feature allows the framework to produce a more accurate prioritization that takes into account the most recent round of regression testing.

Figure 2:
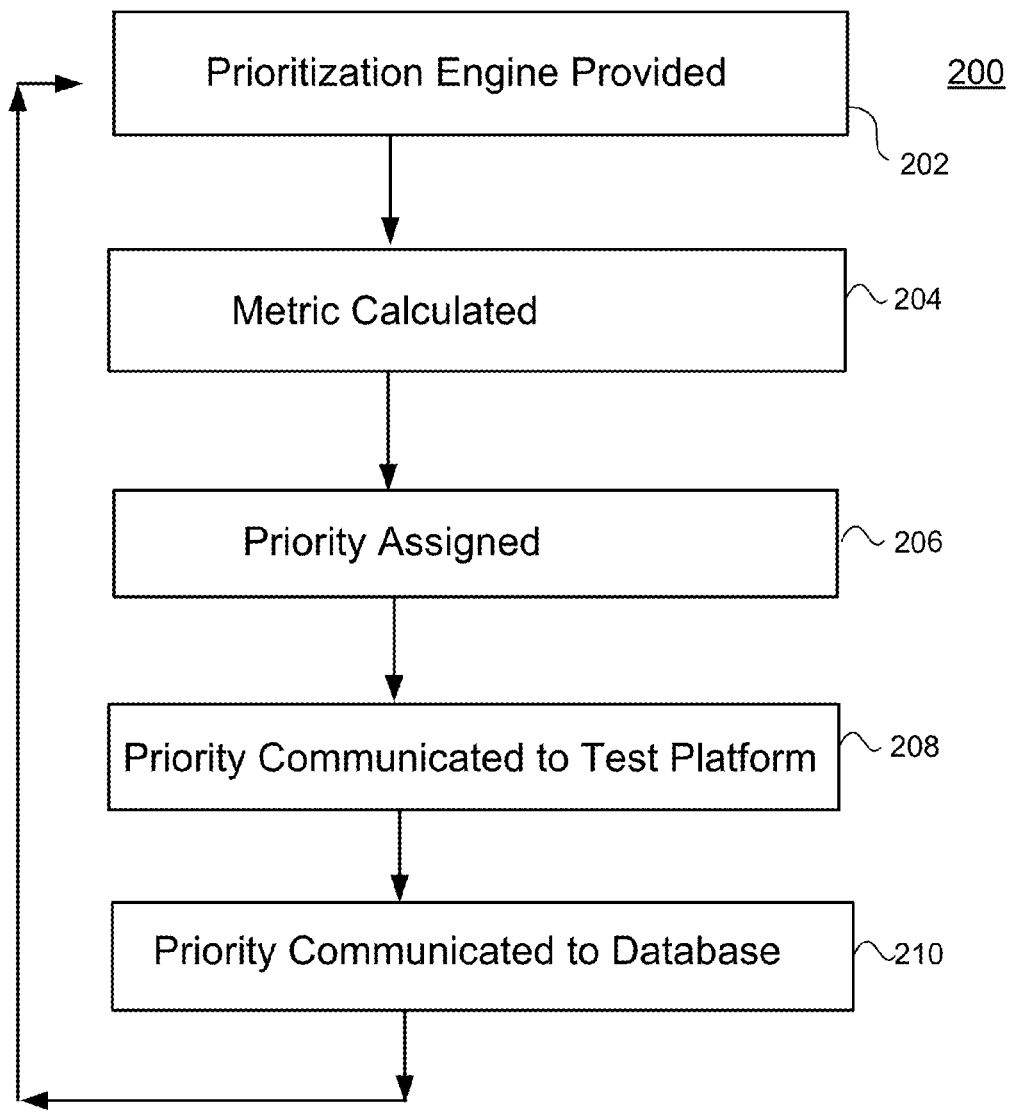
FIG. 2 is a simplified flow diagram of a process according to an embodiment.

FIG. 2 is a simplified flow diagram showing a method 200 of assigning priority to testing according to an embodiment. In a first step 202, an engine is provided in communication with a database storing test case data, which may include a previous prioritization.

In a second step 204, based upon a user input the engine references the test case data to calculate a metric. In a third step 206, the engine determines a priority from the metric.

In a fourth step 208, the engine communicates the prioritization to a testing platform. In a fifth step 210, the engine communicates the prioritization to the database for storage.

For the next round of testing, FIG. 2 shows the process flow returning to the initial step. This feedback provides the adaptive character of the ATCP.

Further details regarding automatic test case prioritization is now provided in connection with the following specific example.

EXAMPLE

Figure 3:
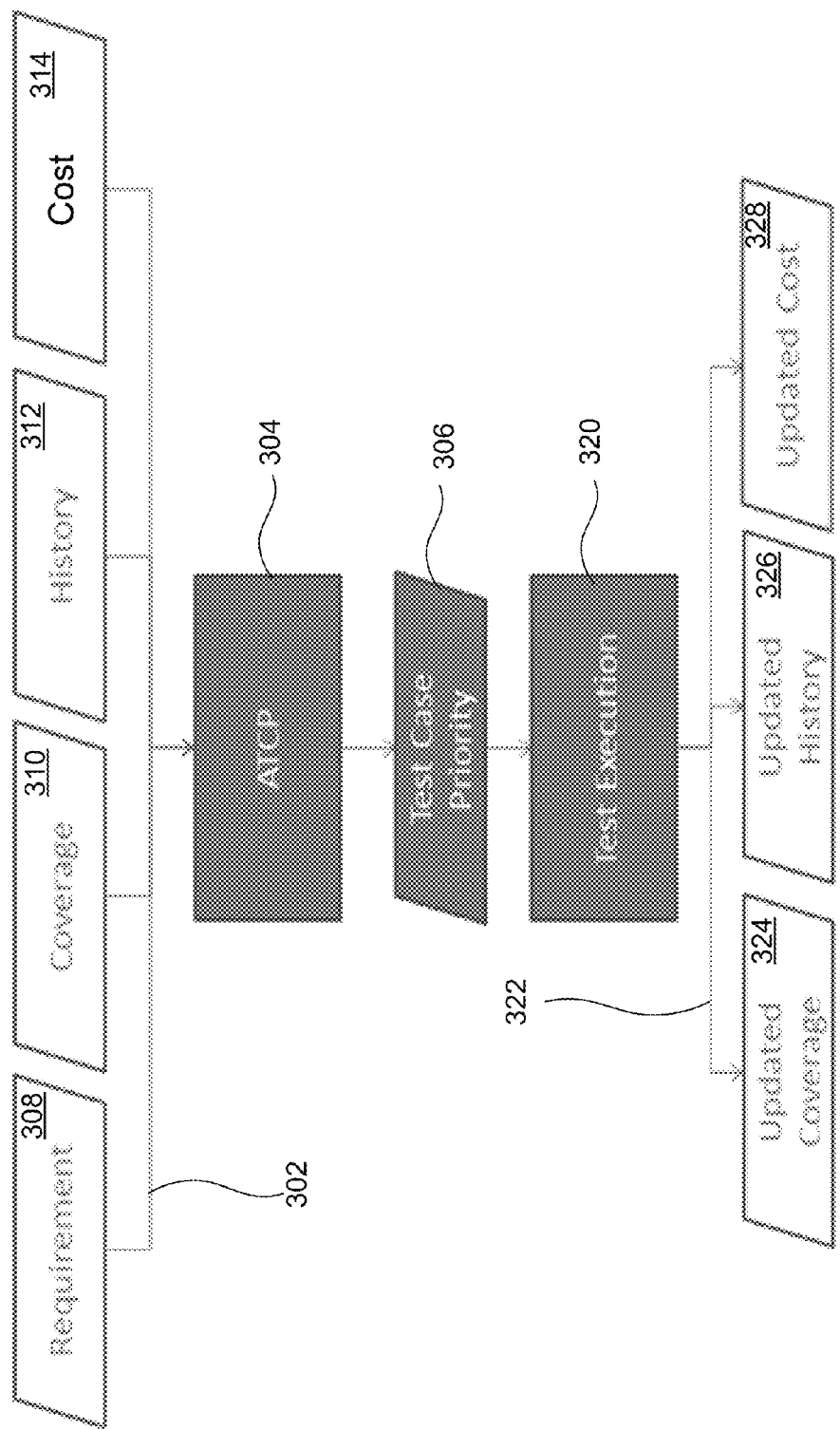
FIGS. 3-9 are simplified flow diagrams illustrating various processes of one example of a test case prioritizing system according to an embodiment.

One example of test case prioritization according to an embodiment, is now presented in connection with FIGS. 3-8. In particular, FIG. 3 presents an overview of the system 300, including inputs 302 to ATCP 304 to determine test case priority 306 during one round of software testing.

As shown in FIG. 3, the prioritization metric may be calculated with reference to one or more of the following types of input factors, taken in combination: requirement 308, coverage 310, history 312, and cost 314. The requirement factor type considers information such as a customer-assigned priority of testing the code, complexity of implementing the code, and proneness of the code to faults. The coverage factor type considers issues such as code coverage, feature coverage, and common usage rate. The history factor type considers previous bug found rate, case stable rate, and priority to calculate. The cost factor type considers test case execution time, and step length. The role of each of these respective factor types in calculating priority, is discussed later below.

As is further shown in FIG. 3, execution 320 of a software test case in a given testing round may produce updated information 322. Such updated information can comprise updated coverage information 324, history information 326, and/or cost information 328.

Figure 4:
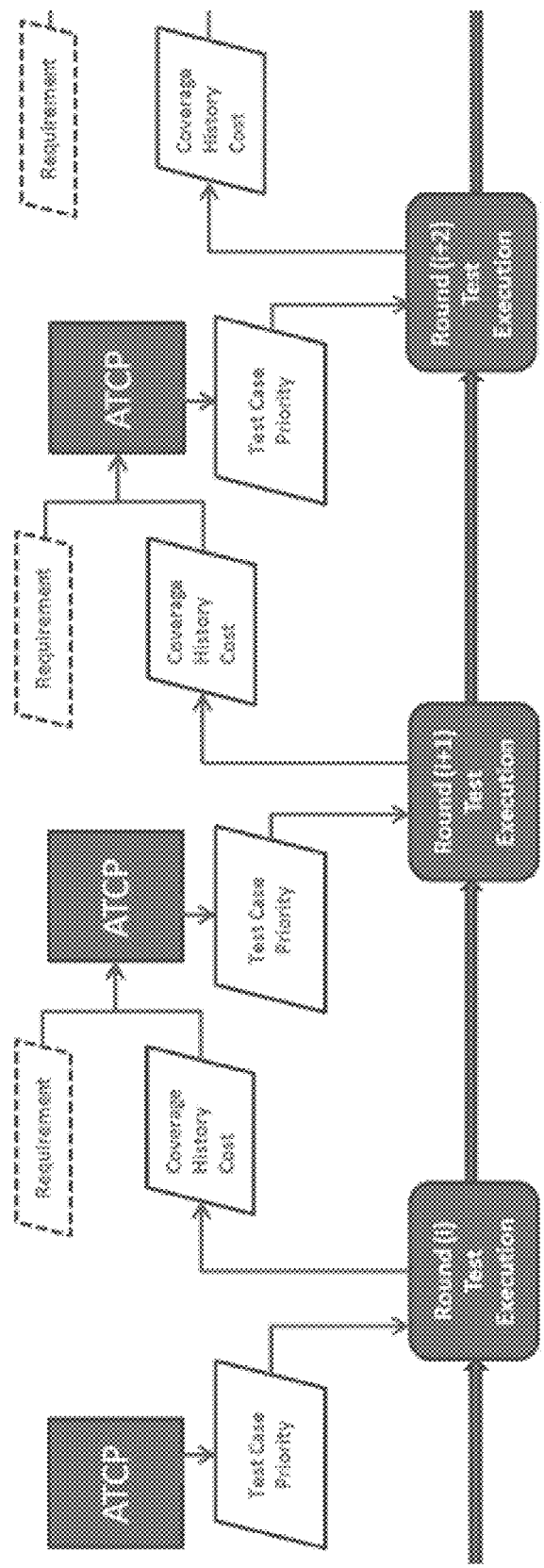

As mentioned above, this updated information may in turn be stored in an underlying database, for access in connection with determining priority of software test cases in future rounds. FIG. 4 is a simplified view showing such operation of the ATCP over multiple testing rounds utilizing updated coverage, history, and/or cost information. By considering the updated information as well as results of prioritizing test cases in previous rounds, the system may adapt to evolving conditions and produce a more accurate prioritization for later testing rounds.

As previously mentioned, the ATCP may automatically assign priority to software testing based upon a calculated metric. Details regarding the metric utilized in this particular example, are now described in connection with FIGS. 5-9.

One set of factors considered in calculating a metric, may comprise requirements. The requirements factors categorize test cases according to product features and workflow. Accordingly, priority based on requirements focus on the importance, complexity, and fault proneness of features. The corresponding calculation factors include customer-assigned priority, implementation complexity and fault proneness. Normally, the more important, more complex and more fault-proneness the test cases, the higher the priority.

Customer-assigned Priority (CP) is one requirement factor that may be considered in calculating the prioritization metric. At the start of planning process, customer requirements are merged or divided into product features and series of developing works. Product owner will sort features by the importance and our test cases related the features can be also sorted.

$$CPV_i = \frac{CP_i}{\sum_{i=0}^{n} CP_i}$$

| Parameter | Definition | Algorithmic method |
|---|---|---|
| $CPV_i$ | Priority of each test case based on CP | Each test case's sequence rates of the sum sequence |
| $CP_i$ | Sequence of each test case | Each feature has a sequence, each feature and its related test cases share the sequence. |

Implementation Complexity (IC) is another requirement factor that may be considered in calculating a prioritization metric. This factor reflects the development effort. In particular, after planning a developer will estimate the efforts of features or tasks.

$$ICV_i = \frac{IC_i}{\sum_{i=0}^{n} IC_i}$$

| Parameter | Definition | Algorithmic method |
|---|---|---|
| $ICV_i$ | Priority of each test case based on IC | Each case developing effort rates of the sum efforts |
| $IC_i$ | Developing effort of each test case related feature | Each feature has developing effort, each feature and its related test cases share the effort. |

After the features are completed, the $IC_i$ can be adjusted by the actual effort.

Fault Proneness (FP) is yet another requirement factor that may be considered in calculating a prioritization metric. Specifically, during the regression testing, some features are changed and may experience frequent faults. Accordingly, it may be desired to increase the testing priorities of such cases $$FPV_i = \frac{FP_i}{\sum_{i=0}^{n} FP_i}$$

| Parameter | Definition | Algorithmic method |
|---|---|---|
| $FPV_i$ | Priority of each test case based on FP | Each case's regression bug found count rates of the sum regression bug counts |
| $FP_i$ | The count of regression bugs found by each test case | Each case's regression bug found count |

Each calculation factor may have its own weight in impacting how much the factor influences the priority of test. For the above three factors, their weight may be simplified as CPW, ICW, and FPW.

$$RV_i = CPV_i * CPW + ICV_i * ICW + FPV_i * FPW$$

| Parameter | Definition | Algorithmic method |
|---|---|---|
| $RV_i$ | Priority of each test case based on requirements | Sum up the priority of each calculation factor |
| CPW | Weight of CP | Given by customer, 0.5 by default |
| ICW | Weight of IC | Given by customer, 0.3 by default |
| FPW | Weight of FP | Given by customer, 0.2 by default |

As shown above, in certain embodiments the following default weights may be given: CPW 0.5, ICW 0.3, and FPW 0.2. A user can adjust the weights by the test cases and make the priorities more reliable. For example, to cover base features, a user may have less focus on complex cases and more focus on fault-proneness, setting ICW to 0.2 and FPW to 0.3.

Figure 5:
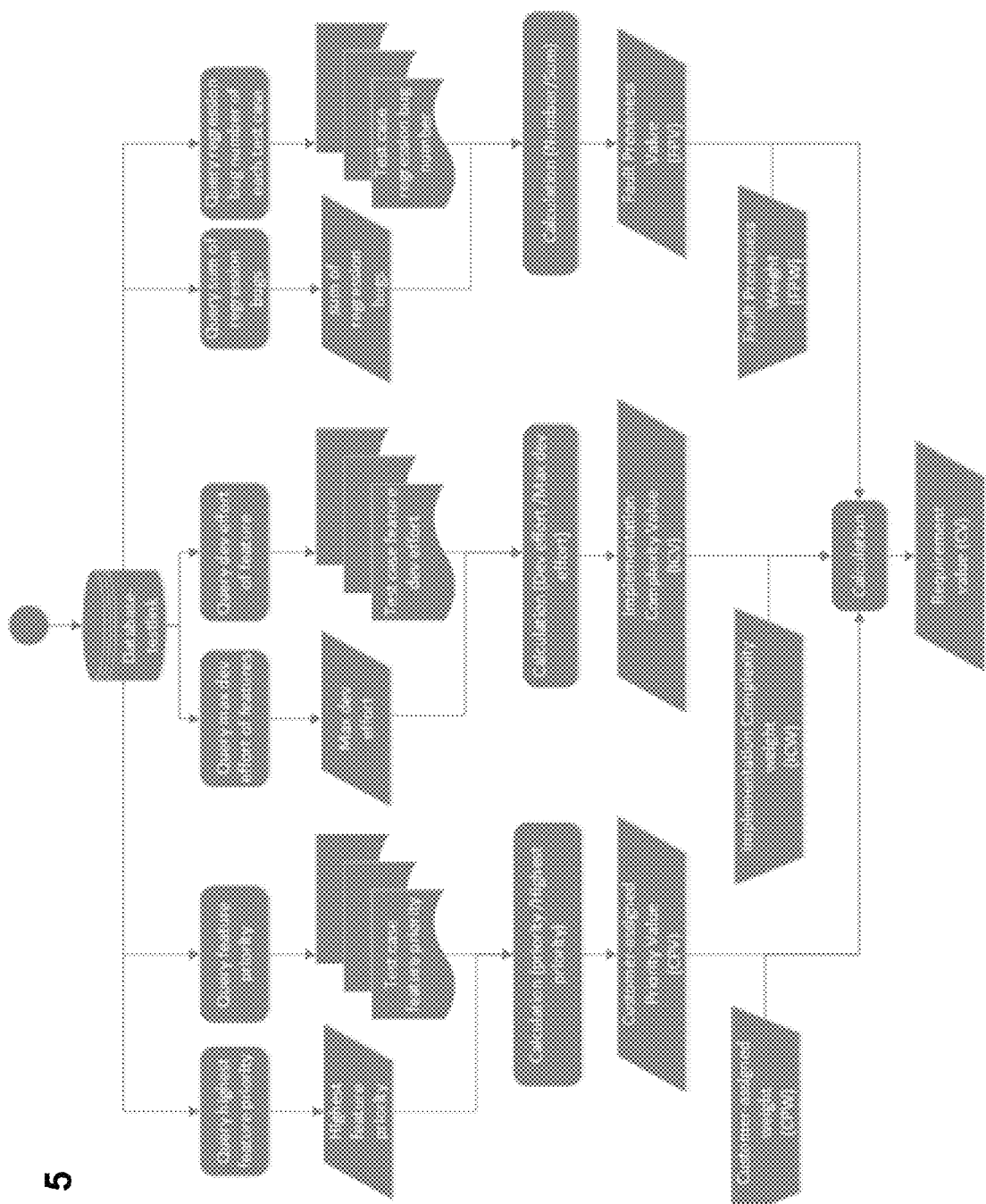

FIG. 5 is a simplified flow diagram summarizing a process for calculating the requirements value component of the prioritization metric according to this example.

Another set of factors that may be considered in calculating a prioritization metric, may relate to coverage. Specifically, test coverage is characterization of the quality of software testing.

One factor in this set is Code Coverage (CC). Code coverage describe the test coverage base on source code, with multiple criteria like function, statement, line, condition coverage. If a test case's code coverage is very high, this may reflect upon a high fault found rate. Accordingly, the CC factor is dedicated to identifying high code coverage cases.

$$\begin{cases} CC = \{CC_1, CC_2, CC_3, \cdots, CC_n\} \\ CCV_i = \dfrac{CC_i}{\text{maximize}(CC)} \end{cases}$$

| Parameter | Definition | Algorithmic method |
|---|---|---|
| $CCV_i$ | Code coverage value of a test case | The code coverage rate divide the maximum value of code coverage rate in n cases |
| $CC_i$ | Coverage rate of a test case | The line number the case covered divide total line number of source code |

Another possible coverage factor is Feature Coverage (FC). The code coverage factor treats all same coverage results equally and thus may not provide sufficient accurate information to determine coverage.

For example, a breadth of code coverage does not necessarily reflect inclusion of important features. High code coverage cases may be low priority for testing (e.g., with testing focused on a special feature offering low risk and little code change). Conversely, low code coverage cases may warrant high prioritization (e.g., with many features covered, or a simple but common used scenario).

To reflect this aspect, test cases that cover more features may exhibit the higher regression risk. The Feature Coverage factor indicates how many features each case covers and gives keywords to flag. This helps to automatically increase the priority level with keywords filtering for high risk features.

$$\begin{cases} FC = \{FC_1, FC_2, FC_3, \cdots, FC_n\} \\ FCV_i = \dfrac{FC_i}{\text{maximize}(FC)} \end{cases}$$

| Parameter | Definition | Algorithmic method |
|---|---|---|
| $FCV_i$ | Feature coverage value of a test case | The $FC_i$ divide the maximum value of $FC_j$ in n cases |
| $FC_i$ | Feature coverage rate of a test case | The number of covered feature of the case |

Another possible coverage factor is Common Usage Rate (CUR). With similar code coverage and feature coverage, test cases may also have differing priority, especially when a case represents an uncommon customer usage. As an example, boundary cases may not be so as important to test if customer has few such scenarios. And, in some situations those having invalid input may not be as important. Thus according to an embodiment, CUR may be valued as follows:

$$CUR = \begin{cases} 0.8, & \text{common(valid input)} \\ 0.2, & \text{uncommon(invalid input)} \end{cases}$$

To summarize, at least three factors may consider the coverage of test prioritization. Users can afford different weights to these factors due to experience. One suggested value is given below:

$$TCV_i = CCR_i \times CCRW + FCR_i \times FCRW + CUR \times CURW$$

| Parameter | Definition | Algorithmic method |
|---|---|---|
| $TCV_i$ | Priority of each test case based on coverage | Sum up the priority of each calculation factor |
| CCRW | Weight of CCR | Given by experience, 0.2 by default |
| FCRW | Weight of FCR | Given by experience, 0.4 by default |
| CURW | Weight of CUR | Given by experience, 0.4 by default |

Figure 6:
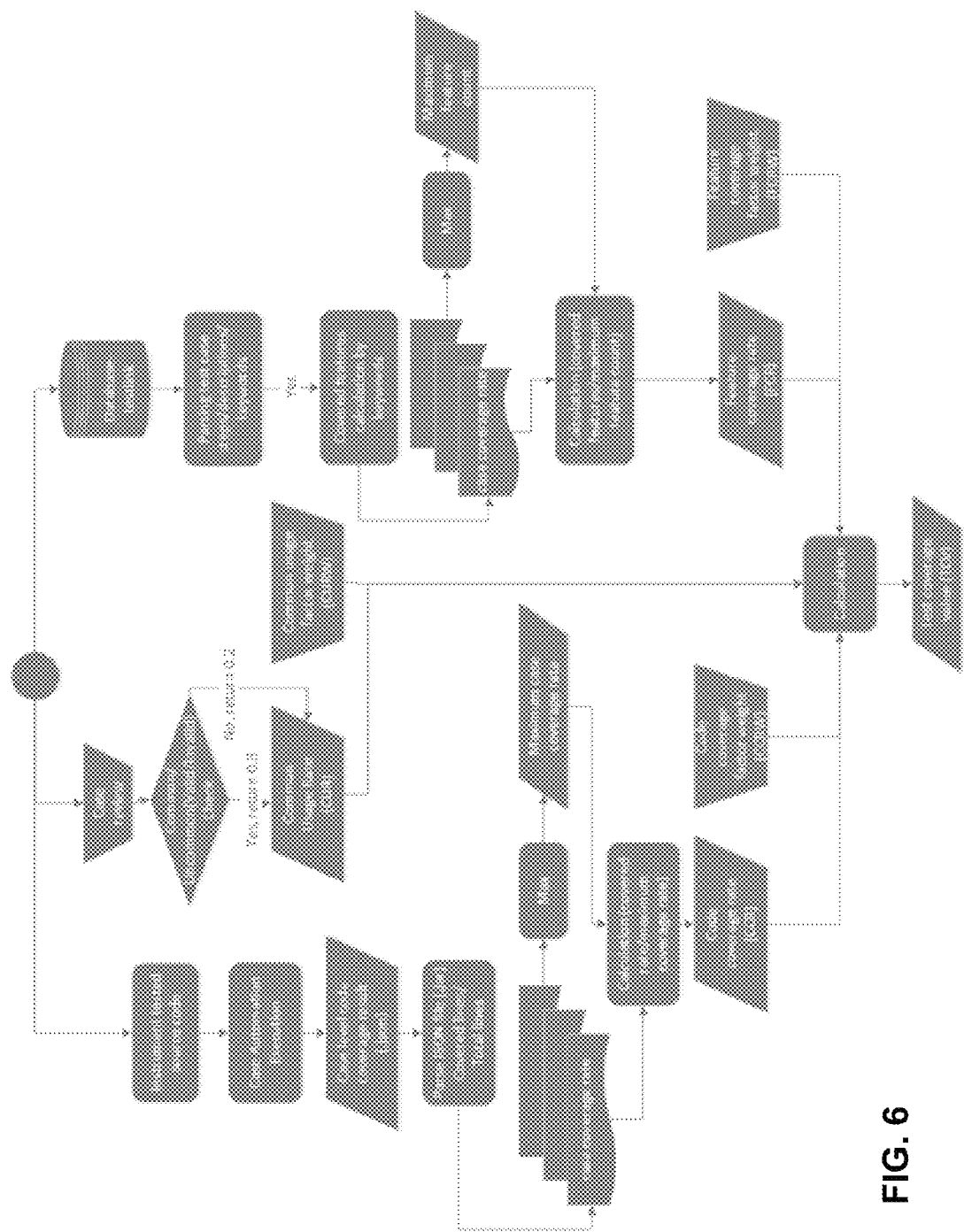

FIG. 6 is a simplified flow diagram summarizing a process for calculating the test coverage value component of the prioritization metric according to this example.

Another set of factors that may be considered in calculating a prioritization metric, may relate to test prior testing history. For example, in sorting test cases based on history information, characteristics such as a bug found rate and test case stability may be considered. According to the exponential smoothing method, such historical testing information may to some extent affect future testing. So past test cases that have previously found bugs or executed unstably, may have a greater likelihood of finding bugs in current code and thus may warrant increasing their priority.

Accordingly, one specific historical testing factor that may be considered to assign a prioritization metric, is Bug Found Rate (BFR). Thus if one test case found bugs at a previous regression, then the developers can fix them and check in code at future versions. So in that future regression test, the priority of test cases previously finding bugs may be increased to check whether the bugs are fixed and whether the code check in integrates new bugs.

Also, if in the previous regression test one test case can found more bugs, this indicates that the module function tested by this test case is unstable or fixed frequently. Then, the priority of the test case should be increased Therefore, a stored record of an amount of bugs found by each test case after each regression test, may be maintained. Then the BFR can be calculated from this record according to the following formula:

$$BFR_{i,j} = \frac{BF_{i,j}}{\sum_{i=0}^{i=n} BF_{i,j}}$$

| Parameter | Definition | Algorithmic method |
|---|---|---|
| $BFR_{i,j}$ | The bug found rate of current case during last j regression test | The percentage of bugs count found by $i^{th}$ test case and the total bugs during last j regression test |
| $BF_{i,j}$ | The bugs' number of the $i^{th}$ test case executed during last j regression test | Each case's regression bug found count during last j regression test |

Here, "n" represents the number of test cases set, and "j" represents a difference value of build number between that current build and a stable build. A greater value of the $BFR_{i,j}$ reflects a stronger ability to find a bug in the $i^{th}$ test case.

Another historical testing factor that may be considered to assign a prioritization metric, is Case Stable Rate (CSR). Specifically, the failure to execute a designed test case during regression testing may reflect two problems.

First, the inability to previously execute a test case may indicate that changes to the system under testing, or the system test environment are unstable. Second, an inability to execute a test case may reveal that the test case and/or the test data is not reasonable. Both of the above situations reflect the risk of the testing system and/or specific test cases.

Accordingly, it may be desired to recreate the workflow to validate a test case and test system, and check for a primary cause of instability. And, it may be desirable to increase a priority of unstable test cases in recognition of possible problems that may exist.

Thus in one embodiment, the CSR factor considered in prioritizing a text case may be expressed as the following:

$$CSR_{i,j} = \frac{CS_{i,j}}{\sum_{i=0}^{i=n} CS_{i,j}}$$

| Parameter | Definition | Algorithmic method |
|---|---|---|
| $CSR_{i,j}$ | The case stable rate of current case during last j regression test | The percentage of unstable times executed by current test case and total test cases during the last j regression testing |
| $CS_{i,j}$ | The times of the $i^{th}$ test case executed unstably | The times of each case ran unsteadily during last j regression test |

Here, "n" represents the number of test cases set. The greater the value of $CSR_{i,j}$, the greater likelihood that the test case or module function tested by current test case is unstable. Such a finding warrants increasing a priority of such a high-scoring test case.

Again, embodiments may assign a weight to the various historical testing factors. Thus during regression testing, testers can set different factor weights of BFR and CSR according to the actual needs, and sort the test cases according them.

In certain embodiments, the same weight may be set for BFR and CSR, and the test case prioritization based on the history information (HV, History Value) is calculated as follows:

$$HV_{i,j} = BFR_{i,j} * BFW + CSR_{i,j} * CSW$$

| Parameter | Definition | Algorithmic method |
|---|---|---|
| $HV_{i,j}$ | The case stable rate of current case during last j regression test | The percentage of unstable times executed by current test case and total test cases during the last j regression testing |
| BFW | Weight of BFR | According to experience, 0.5 for original |
| CSW | Weight of CSR | According to experience, 0.5 for original |

Figure 7:
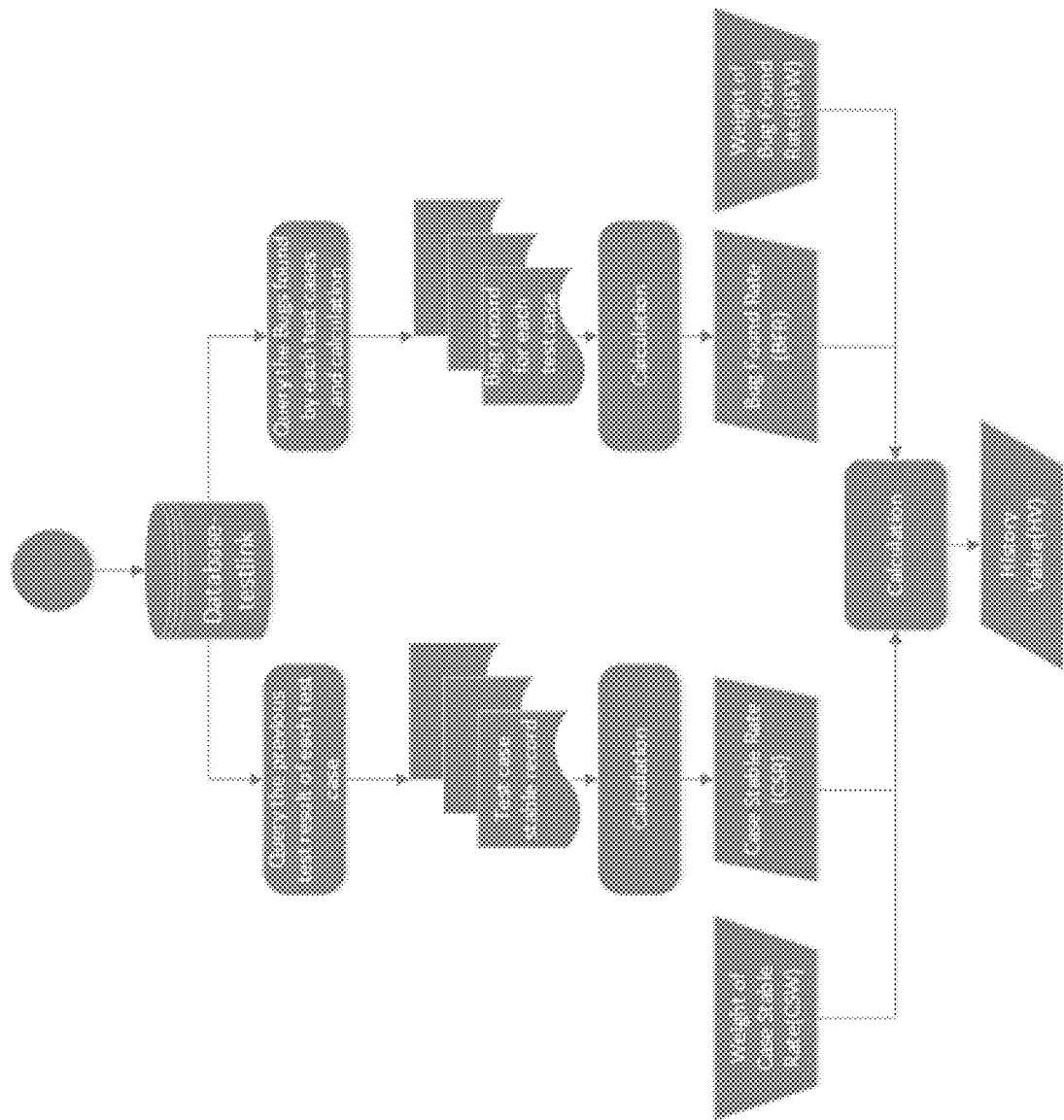

FIG. 7 is a simplified flow diagram summarizing a process for calculating the history value component of the prioritization metric according to this example.

Still another set of factors that may be considered in calculating a prioritization metric, may relate to cost. In cost oriented test case prioritization, a cost of prioritizing each test case is calculated.

According to certain embodiments, two major factors may be considered as cost impact factors. One factor is test case execution time. Another factor is step length.

The test case execution time may be quantified according to a Test Case Execution Time Rate (TETR). Thus test cases having a short execution time may be prioritized when performing regression testing.

Time cost may be important during a product delivery process. So, a long test execution time may indicate against a high priority, with higher priority assigned to test cases having less execution time.

Therefore, each test case's automation execution time during a round of regression testing may be recorded. Then, TETR is calculated from this stored information according to the following formula:

$$\begin{cases} TET = \{TET_1, TET_2, TET_3, \cdots, TET_n\} \\ TETR_i = 1 - \frac{TET_i}{\text{maximize}(TET)} \end{cases}$$

| Parameter | Definition | Algorithmic method |
|---|---|---|
| $TETR_i$ | Priority of each test case based on test case execution time | Compare to the longest execution time, each test case execution time rate is between 0 and 1, the shorter is its time, and the bigger is the rate. |
| $TET_i$ | Test case execution time | Get it from the automation report |

Another cost factor is Step Length Rate (SLR). In particular, those test cases having a simple workflow may also be desired during regression testing. This may be because the analysis cost is decreased if the test case is failed.

Thus according to embodiments, those test cases having a simple workflow may be assigned higher priority. The step length rate of the test cases is an indicator to help estimate the test case's priority.

In an example, SLR is calculated according to the following formula:

$$\begin{cases} SL = \{SL_1, SL_2, SL_3, \cdots, SL_n\} \\ SLR_i = 1 - \dfrac{SL_i}{\text{maximize}(SL)} \end{cases}$$

| Parameter | Definition | Algorithmic method |
|---|---|---|
| $SLR_i$ | Priority of each test case based on step length | Compare to the most of test case step number, each test case step length rate is between 0 and 1, the more is its steps number, and the less is the rate. |
| $SL_i$ | Step number of each test case | Get it from the automation report |

Again, the TETR and SLR may be assigned to a factor weight (FW). Then, the product of the factor and FW are summed. The result is the cost value (CV) that may be considered as impacting test case priority.

$$CV_i = TETR_i * TETW + SLR_i * SLW$$

| Parameter | Definition | Algorithmic method |
|---|---|---|
| $CV_i$ | Priority of each test case based on cost | Sum up the priority of each calculation factor |
| TETW | Weight of TETR | Given by customer, 0.6 by default |
| SLW | Weight of SLR | Given by customer, 0.4 by default |

Figure 8:
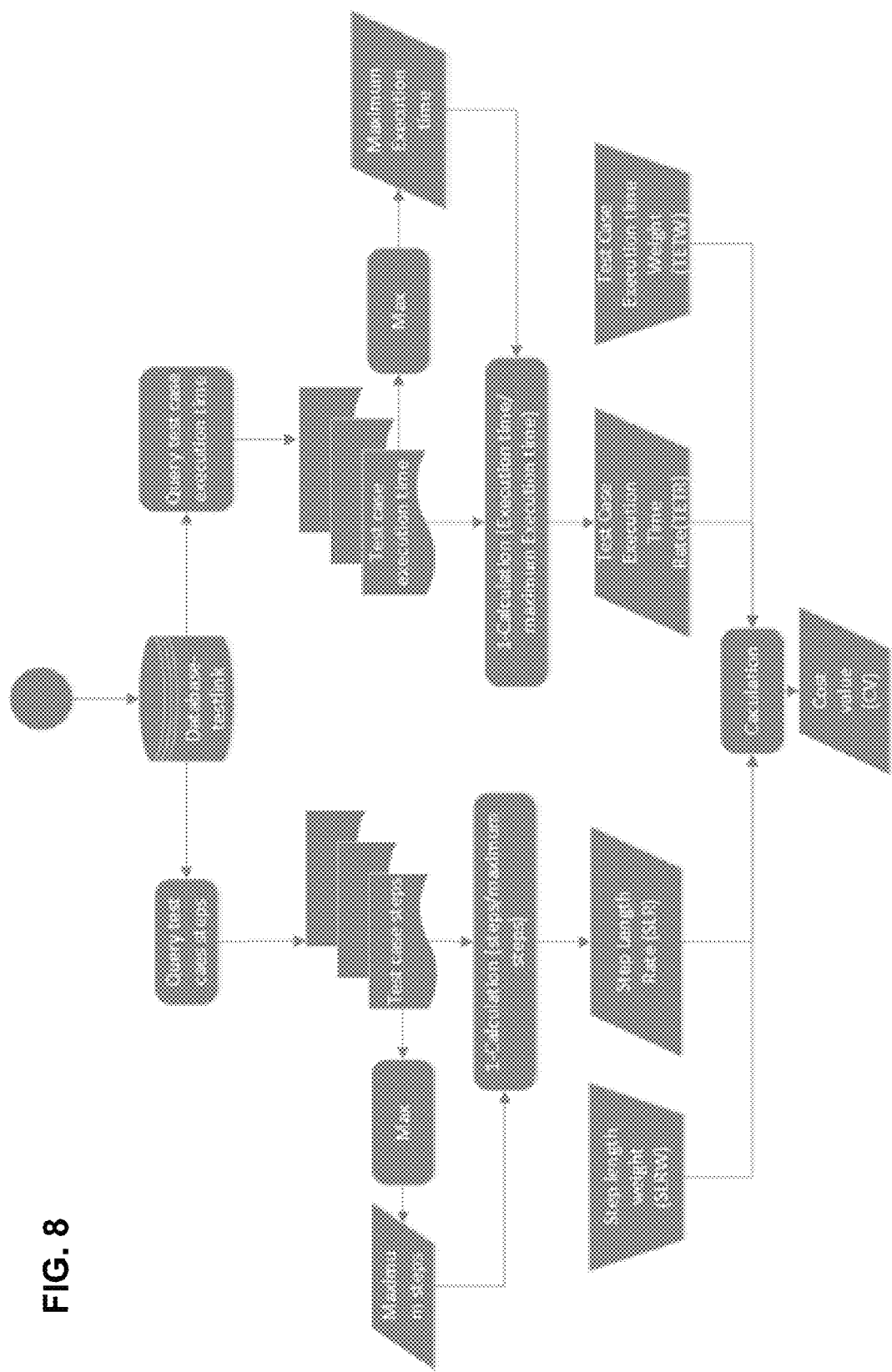

FIG. 8 is a simplified flow diagram summarizing a process for calculating the cost value component of the prioritization metric according to this example.

A sample test case prioritization calculation is now given. The priority value of each test case is the sum of the weighted factors (e.g., requirement, coverage, history, cost).

The rate is not a final priority of test cases. Rather, the rates may be sorted, and then each test case given a priority based on maximum and minimum of rate. The priority may generally be divided into three levels: high, medium and low.

$$PV_{i,j} = RV_{i,j} * RW + TCV_{i,j} * TCW + HV_{i,j} * HW + CV_{i,j} * CW$$

| Parameter | Definition | Algorithmic method |
|---|---|---|
| $PV_{i,j}$ | During $j^{th}$ round of regression, the priority value of each test case based on requirement, test coverage, history and cost | Sum up four factor to get the finial priority value |
| RW | Weight of RV | Given by customer, 0.5 by default |
| TCW | Weight of TCV | Given by customer, 0.2 by default |
| HW | Weight of HV | Given by customer, 0.2 by default |
| CW | Weight of CV | Given by customer, 0.1 by default |

Figure 9:
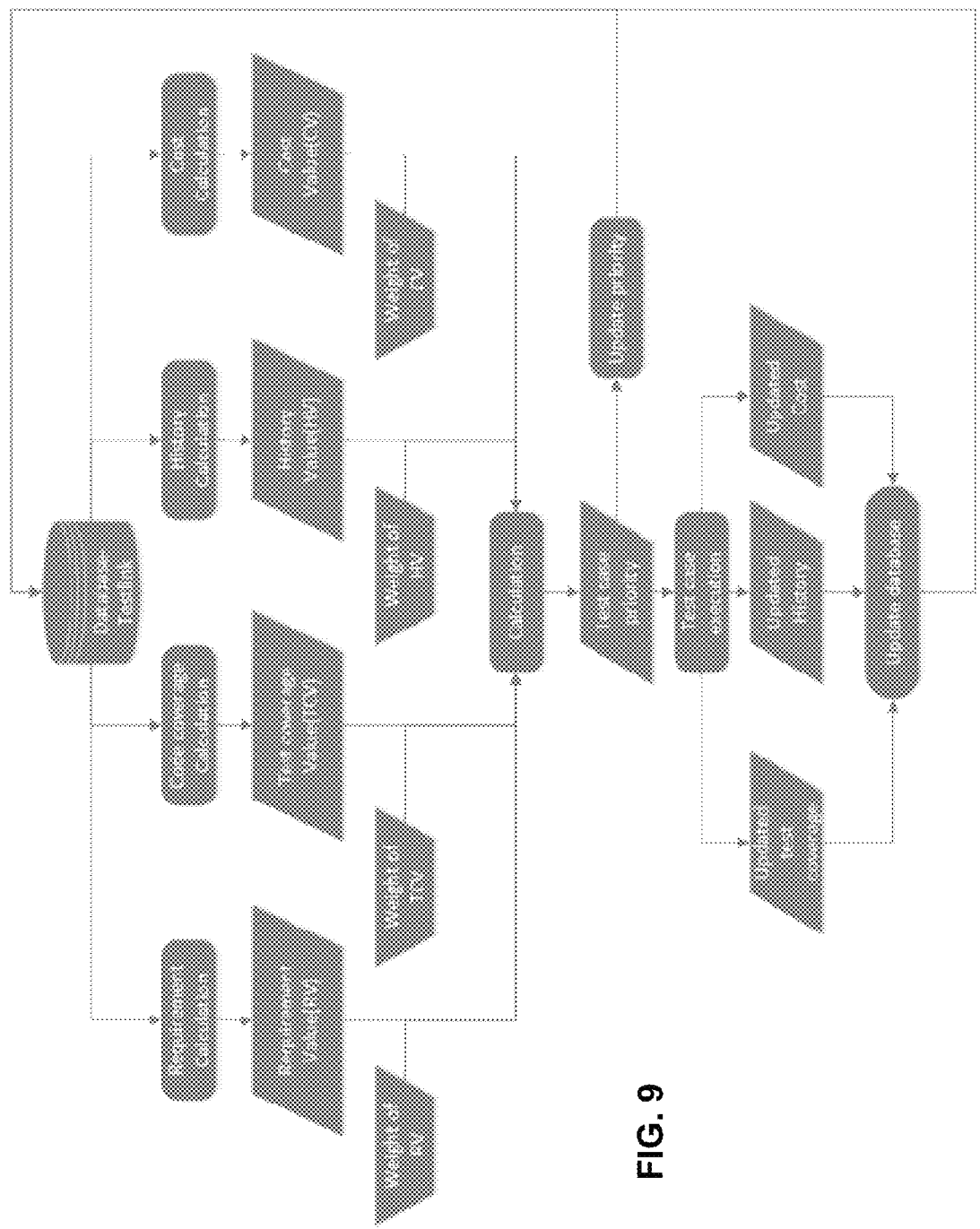

FIG. 9 is a simplified flow diagram summarizing a process for calculating the prioritization metric of this example from its respective components, according to an embodiment.

The above describes the calculation of test case prioritization for a single round of testing. However, each test case is re-assigned a priority in jth round of regression testing, and executor will execute these test cases in $j+1^{th}$ round of regression testing based up on the priority result.

Thus in a $j+1^{th}$ round of regression testing, the factors of requirement value (RV), Test coverage value (TCV), History value (HV) and Cost value (CV) will be re-calculated to generate the new test cases priority result. In this manner, embodiments offer the ability to automatically determine test case prioritization in an adaptive manner.

An example of possible adaptation to a requirement factor is illustrated in the following scenario. During iterative testing process, the priority of each case based on IC and IP is not affected by CP. In a $j+1^{th}$ round, new requirements bring new test cases, and calculating their priorities based on CP depends on the highest priority of jth round. Normally, new test cases have higher priorities Here, $CP_i$, $IC_i$, and $FP_i$ in the $j^{th}$ round are retained in the $j+1^{th}$ round. $CP_i$ of each new test case adds the max $CP_i$ in $j^{th}$ round. The priorities of all test cases are recalculated in $j+1^{th}$ round. In addition, some requirements in $j^{th}$ round changed in $j+1^{th}$ round are considered as new requirements, and the related test cases are considered as new test cases.

An example of possible operation of the ATCP in an adaptive manner regarding history information, is illustrated in the following scenario. After the $j^{th}$ regression test is finished, if the $i^{th}$ test case found n bugs, the $BF_{i,j}$ should be added n. If the $i^{th}$ test case ran unsteadily, the $CS_{i,j}$ should be added 1. Then, the HV of the cases that found bugs or instability will be increased. In the next regression test, its priority may be increased.

An example of possible operation of the ATCP in an adaptive manner regarding cost is illustrated in the following scenario. The Cost value (CV) will re-calculate for each round. Because the maximum of test cases execution time and maximum of test case step number will be changed in new round of regression testing, $CV_i$ will also be changed and re-affect the calculated test case priority.

There are at least a couple of scenarios in which an ATCP according to an embodiment may operate in an adaptive manner regarding coverage information. Regarding code coverage, projects may utilize a code coverage tool to obtain code coverage information automatically. That statistic will be used and updated after each test execution lifecycle for any code change. Then, a case priority value will be re-calculated automatically before next round test execution lifecycle.

An embodiment of an ATCP may also handle feature coverage information in an adaptive manner. Specifically, software features are defined by product owner, and may change if a workflow is updated and/or a new feature included. Common usage rate is an experience rate and can be adjusted manually. This adaptive behavior can start as soon as values change.

In summary, the adaptive test case prioritization framework according to embodiments, is effective in consistently and automatically ranking a priority of test cases for testing activity during software development. The framework can be implemented by integrating with test team's existing framework.

Here, the prioritization was implemented in connection with the open source TESTLINK web-based test management system. The testing prioritization system may be further integrated with other elements, e.g., a bug tracking system (such as JIRA available from Atlassian, Inc. of Sydney, Australia), code coverage reports, and extendable automation frameworks.

By relying upon the testing prioritization framework, testers will benefit from the accurate priority of test cases, facilitating rapid and verifiable decision making concerning which test cases to run according to the up-to-date priority. This in turn allows each round of testing to become more reliable and effective.

Figure 10:
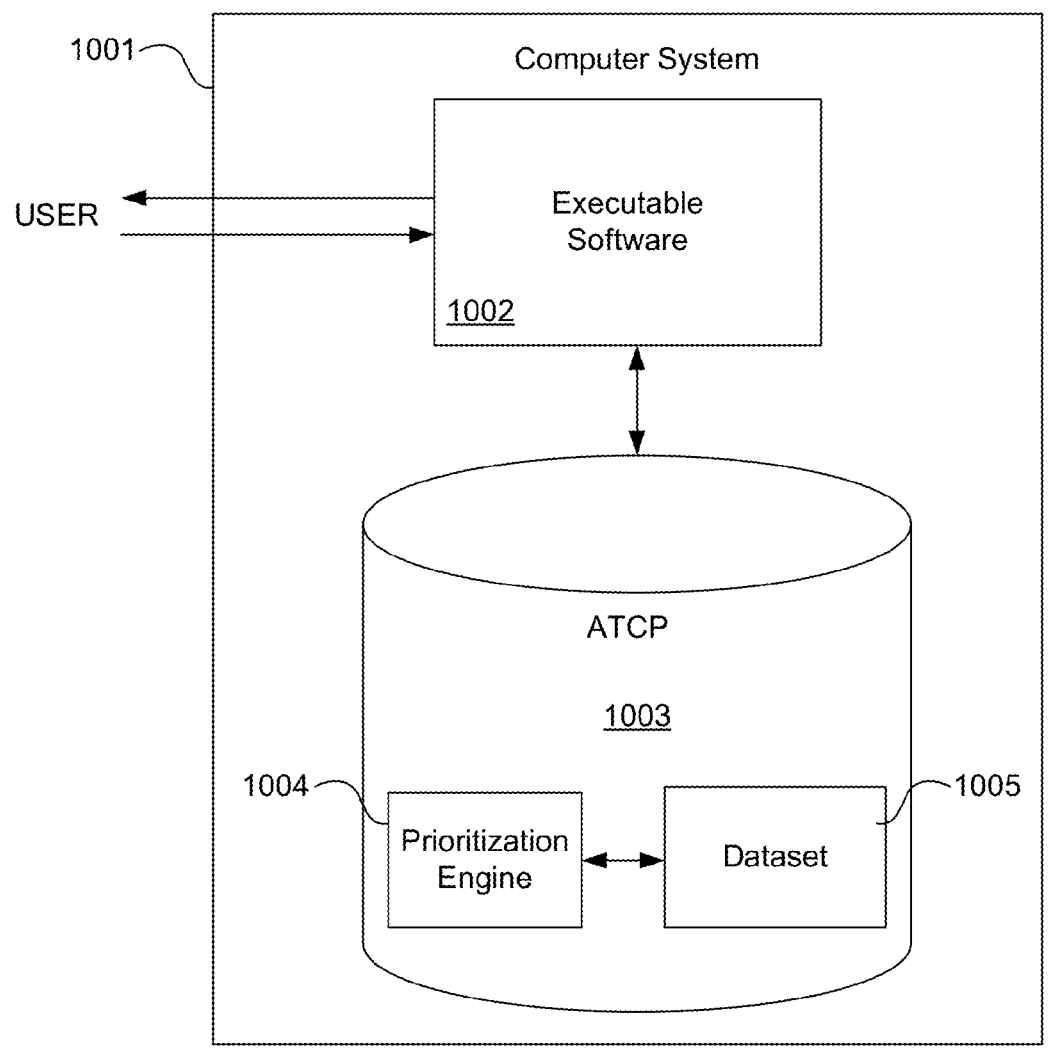
FIG. 10 illustrates hardware of a special purpose computing machine configured to perform test case prioritization according to an embodiment.

FIG. 10 illustrates hardware of a special purpose computing machine configured to perform prioritization of software testing according to an embodiment. In particular, computer system 1001 comprises a processor 1002 that is in electronic communication with a non-transitory computer-readable storage medium 1003 of an ATCP. This computer-readable storage medium has stored thereon code 1005 corresponding to a dataset of software test case information. Code 1004 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 11:
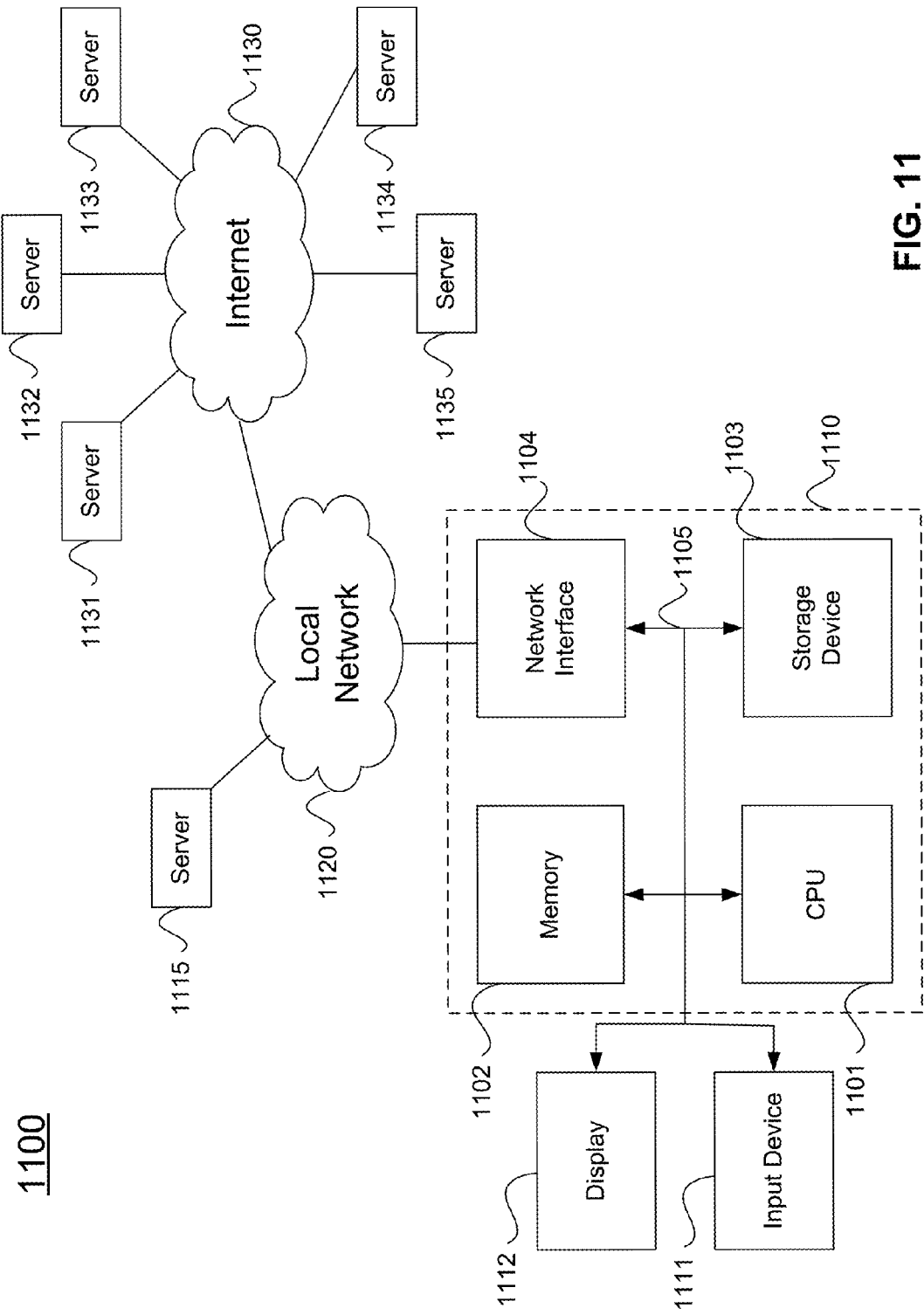
FIG. 11 illustrates an example of a computer system.

An example computer system 1110 is illustrated in FIG. 11. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a user input and information about a software test case from a database, wherein the information comprises coverage information including a code coverage rate and a separate feature coverage rate calculated from a keyword;
processing the information to calculate in a first testing round, a first metric for the software test case, the first metric comprising a weighted code coverage factor and a weighted feature coverage factor;
assigning a testing priority to the software test case for the first testing round based upon the first metric; and
communicating the testing priority to the database for storage.

2. A method as in claim 1 further comprising:
receiving another user input and updated information about the software test case from the database;

processing the updated information to calculate in a second testing round, a second metric for the software test case;
assigning an adaptive testing priority to the software test case for the second testing round based on the second metric; and
communicating the adaptive testing priority to the database for storage.

3. A method as in claim 2 comprising:
receiving the testing priority from the database; and
calculating the second metric based upon the testing priority and the updated information.

4. A method as in claim 2 wherein the updated information comprises updated history information, updated coverage information, and updated cost information.

5. A method as in claim 1 wherein the information comprises requirement information including a customer-assigned priority value, an implementation complexity value, and a fault proneness value.

6. A method as in claim 1 wherein the information comprises coverage information further including a common usage rate separate from the code coverage rate and the feature coverage rate.

7. A method as in claim 1 wherein the information comprises history information including a case stable rate and a bug found rate.

8. A method as in claim 1 wherein the information comprises cost information including a step length rate and a test case execution time rate.

9. A method as in claim 1 further comprising communicating the first metric to the database for storage.

10. A non-transitory computer readable storage medium embodying a computer program for performing a method, said method comprising:
receiving a user input and information about a software test case from a database, the information comprising coverage information including a code coverage rate and a separate feature coverage rate calculated from a keyword;
processing the information to calculate in a first testing round, a first metric for the software test case, the first metric comprising a weighted code coverage factor and a weighted feature coverage factor;
assigning a testing priority to the software test case for the first testing round based upon the first metric; and
communicating the testing priority to the database for storage.

11. A non-transitory computer readable storage medium as in claim 10 wherein the method further comprises:
receiving another user input and updated information about the software test case from the database;
processing the updated information to calculate in a second testing round, a second metric for the software test case;
assigning an adaptive testing priority to the software test case for the second testing round based on the second metric; and
communicating the adaptive testing priority to the database for storage.

12. A non-transitory computer readable storage medium as in claim 11 wherein the method further comprises:
receiving the testing priority from the database; and
calculating the second metric based upon the testing priority and the updated information.

13. A non-transitory computer readable storage medium as in claim 12 wherein the updated information comprises updated history information, updated coverage information, and updated cost information.

14. A non-transitory computer readable storage medium as in claim 10 wherein the information further comprises at least one of:
requirement information including a customer-assigned priority value, an implementation complexity value, and a fault proneness value;
the coverage information further including a common usage rate separate from the code coverage rate and the feature coverage rate;
history information including a case stable rate and a bug found rate; and
cost information including a step length rate and a test case execution time rate.

15. A non-transitory computer readable storage medium as in claim 10 wherein the method further comprises communicating the first metric to the database for storage.

16. A computer system comprising:
one or more hardware processors;
a software program, stored in a non-transitory computer-readable storage medium and executable on one of said hardware processors, the software program configured to:
cause a prioritization engine stored in the non-transitory computer-readable storage medium to receive a user input and information about a software test case from a database stored in the non-transitory computer-readable storage medium, wherein the information comprises coverage information including a code coverage rate and a separate feature coverage rate calculated from a keyword;
cause the prioritization engine to process the information to calculate in a first testing round, a first metric for the software test case, the first metric comprising a weighted code coverage factor and a weighted feature coverage factor;
cause the prioritization engine to assign a testing priority to the software test case for the first testing round based upon the first metric;
cause the prioritization engine to communicate the testing priority to the database for storage;
cause the prioritization engine to receive another user input and updated information about the software test case from the database;
cause the prioritization engine to process the updated information to calculate in a second testing round, a second metric for the software test case;
cause the prioritization engine to assign an adaptive testing priority to the software test case for the second testing round based on the second metric; and
cause the prioritization engine to communicate the adaptive testing priority to the database for storage.

17. A computer system as in claim 16 wherein:
the prioritization engine receives the testing priority from the database; and
the prioritization engine calculates the second metric based upon the testing priority and the updated information.

18. A computer system as in claim 17 wherein the updated information further comprises updated coverage information, updated history information and updated cost information.

19. A computer system as in claim 16 wherein the information comprises at least one of:

requirement information including a customer-assigned priority value, an implementation complexity value, and a fault proneness value;

the coverage information further including a common usage rate separate from the code coverage rate and the feature coverage rate;

history information including a case stable rate and a bug found rate; and cost information including a step length rate and a test case execution time rate.

20. A computer system as in claim 16 wherein the software program further comprises code configured to cause the prioritization engine to communicate the first metric to the database for storage.

* * * * *